United States Patent [19]
Browne

[11] 3,797,100
[45] Mar. 19, 1974

[54] SOLDERING METHOD AND APPARATUS FOR CERAMIC CIRCUITS

[76] Inventor: Lawrence T. Browne, 1120 Coast Village Cir., Santa Barbara, Calif. 93103

[22] Filed: Apr. 12, 1971

[21] Appl. No.: 133,315

[52] U.S. Cl. .................... 29/471.1, 29/498, 29/626, 29/628, 228/47
[51] Int. Cl. ............................................ B23k 31/02
[58] Field of Search ............ 29/498, 626, 627, 589, 29/471.3, 471.1, 628; 228/3.5, 6, 47

[56] References Cited
UNITED STATES PATENTS

| | | | |
|---|---|---|---|
| 2,636,920 | 4/1953 | Lockery et al. | 29/626 UX |
| 3,205,572 | 9/1965 | Jochems | 29/498 X |
| 3,286,340 | 11/1966 | Kritzler et al. | 29/471.1 |
| 3,380,155 | 4/1968 | Burks | 29/591 |
| 3,486,223 | 12/1969 | Butera | 29/471.1 X |
| 3,617,682 | 11/1971 | Hall | 29/471.1 |

*Primary Examiner*—J. Spencer Overholser
*Assistant Examiner*—Ronald J. Shore
*Attorney, Agent, or Firm*—Fitzpatrick, Cella, Harper & Scinto

[57] ABSTRACT

Disclosed herein is a method and apparatus for soldering electronic components to conductor pads on a ceramic substrate, wherein the source of heat for melting the solder is applied in a localized manner to the underside of the substrate. In the apparatus, a miniature hydrogen torch is disposed adjacent the underside of the substrate, in alignment with a component to be soldered to the upperside thereof, and the flame of the torch is electronically controlled by an ignition and valving system. The ignition system comprises a heating filament, disposed adjacent the discharge orifice of the torch, for being heated to ignite a valve-released jet of hydrogen, after which the filament is deenergized and the resultant flame is maintained for a predetermined period sufficient to effect a satisfactory soldered connection between the component and the substrate.

13 Claims, 2 Drawing Figures

SOLDERING METHOD AND APPARATUS FOR CERAMIC CIRCUITS

BACKGROUND OF THE INVENTION

Conventional techniques for effecting solder joints between electronic components and ceramic substrate conductor pads embody many recognized deficiencies. For example, one conventional technique for making such solder joints relies on the use of a soldering iron for the point application of a heated metal tip to the area which is to be soldered. However, such use of a soldering iron often results in contamination of the soldered area, a destructively high temperature applied to the electronic component, inefficient heat transfer, and physical stresses caused by the pressure of the heating tip applied to the soldered area. Furthermore, it is extremely difficult to remove, by means of a soldering iron, a component which has already been soldered in place, since it is necessary to simultaneously heat all of the conductor leads of the component before it can be removed. Various other difficulties caused by the use of soldering irons, include their tendency to cause the formation of surface oxides at the soldered joints, and their application of electrical currents applied by the heating tips, which currents, although minute, can cause destruction of microminature electronic components. Similarly, other conventional devices for practicing localized solder heating techniques, such as heated wire elements, resistance heating devices, focused infrared heat, open flame torches, super-heated inert gas jets, and laser devices, all of which devices embrace some or all of the above difficulties, have been used in the past only to apply heat energy to the component side of the circuit board.

Bulk heating soldering techniques, while overcoming some of the above-mentioned problems, give rise to additional problems. Included in this category of soldering techniques are processes using hot plates, heated support fixtures, infrared radiant heaters, heated ovens, induction heaters, and wave or dip soldering apparatus. In each of these processes, the entire substrate is heated to melt all of the solder thereon. Thus, in bulk soldering processes, the duration of the heat application often causes component and circuit damage. For example, thin metallizations previously disposed on the substrate are often dissolved.

Furthermore, the use of these various conventional techniques on newly developed ceramic substrate materials has been limited by the high heat conductivity thereof, wherein problems have arisen in the form of "cold" solder joints due to thermal cooling by the substrate, thermal stresses in the connections due to unequal heating between the components and substrate, and heat damage to temperature sensitive components.

Thus, an object of this invention is to provide a method and apparatus for effecting soldered joints, wherein a localized source of heat is appied, without the necessity of making physical contact between the heating means and the joints to be soldered. More particularly, an object of this invention is to apply such heat in the underside of a ceramic substrate, whereby the heat is efficiently transferred through the substrate to the soldered joints.

A further object of this invention is to provide an automatically controlled apparatus for applying such heat to a localized area of the underside of the substrate so that the component side of the substrate remains unobstructed, and whereby a non-oxidized soldered joint is effected in a highly efficient manner.

SUMMARY OF THE INVENTION

In accordance with the invention, there is provided a method and apparatus for applying heat to the underside of a substrate in a localized area thereof, and without the necessity of exerting a bearing pressure on the substrate. In particular, in a preferred embodiment of the invention, a miniature gas torch is disposed to discharge an ignited jet of gas toward the underside of a substrate at a position opposed to a component which is to be soldered to the underside thereof. Upon actuation of the device, the jet of gas is discharged and ignited for a timed period sufficient to generate heat which is conducted through the substrate to effect a solder joint. Hydrogen gas has been found to be preferably for supplying adequate heat, in a clean non-oxidizing and non-carbonizing manner.

In a modification of the above-described method the substrate is moved along a path which carries it past a bank of such torches, aligned with the various conductor pads on the substrate, so that all of the desired solder joints can be completed automatically, and without the necessity of manually repositioning the substrate after completion of each joint.

In a preferred embodiment of the apparatus of the invention, the minature gas torch is connected to a source of hydrogen, and a filament is disposed adjacent the discharge orifice of the torch to ignite the gas, thereby producing a flame at a localized area beneath the substrate. The torch and igniting means are fixedly mounted centrally of a base plate, and a hollow frame, having a high temperature wire grid on its upper surface, is slidably disposed on the base plate to surround the torch. The substrate is placed on the wire grid, and the components to be soldered are disposed on their respective conductor pads, whereupon the frame is slidably moved to successively position each component directly over the torch. A binocular microscope, fixed with respect to the base plate, is positioned with its cross hairs aligned with a point in the plane of the wire grid, which point is directly above the discharge orifice of the torch, to enable an accurate positioning of the components with respect to the discharge orifice.

An electronic actuating circuit is connected to the igniting filament and to a gas solenoid valve for synchronizing their operation to permit the simultaneous discharge of a supply or gas from the torch, and a supply of current to the igniting filament to ignite the heating flame. The electronic circuit maintains the supply of current to the fialment for a timed period to ensure the ignition of the flame, whereupon the filament is de-actuated while the solenoid valve is maintained in an open position for an additional time period to ensure an adequate supply of heat to effect the soldered joint. After this additional timed period, the solenoid valve closes to extinguish the flame, whereupon the slidable frame is moved to successively position other components over the torch.

BRIEF DESCRIPTION OF THE DRAWINGS:

The accompanying drawings illustrate a preferred embodiment of the invention. In such drawings.

DETAILED DESCRIPTION OF A PREFERRED EMBODIMENT

In a preferred method according to the invention, the conductor pads of a substrate, such as a sheet of ceramic material, may be coated with solder prior to the positioning of components thereon; or, conveniently, a granular solder paste may be applied to the components or the conductor pads, thereby providing the extra function of holding the components in place over the pads to which they are to be soldered. The substrate is then disposed horizontally, with the components on the upper side therof, and a source of heat is positioned at the underside of the substrate in a spaced relation therefrom and in alignment with a conductor of the component to be soldered, so that the heat is conducted through the substrate to the selected conductor pad and component lead to provide sufficient heat for melting the solder and effecting a reliable mechanical and electrical joint. In a preferred embodiment, a gas flame is used as the heat source, but other heat sources can be used such as a non-burning superheated gaseous jet. As will be the case in many instances, the components may comprise chip-type components, whereupon the gas flame may be directed centrally of the component, from the underside of the substrate, for simultaneously soldering all of the component termainsl to their respective pads.

Extensive experiments have proven that reliable solder joints are obtained when a source of hydrogen, at a pressure of 0 to 5 psi, is connected to a miniature torch having an orifice of from 0.002 in. to 0.020 in. Furthermore, by positioning the minature torch orifice at about ⅛ to ¼ inches below the substrate, an optimum result is attained, wherein the intensity of the flame can be varied by changing the size of the orifice, or by varying the gas pressure and the duration of the flame. However, other inflammable gases may be used such as propane, butane, acetylene, alcohol vapor, gas/oxygen mixtures, and other inflammable mixtures. Also, the various substrate materials which are useble with this method include alumina and beryllia ceramics, other metal oxide materials, pyrex glass, asbestos, and other non-combustible materials.

Where an automated process is desired the substrate is placed on a conveyor and carried automatically past a plurality of such torch/igniter combinations, in a direction wherein each of the conductor pads makes a single pass over a torch flame, during which pass a solder joint is accomplished as described above. Alternatively, a matrix of torch/igniter combinations can be provided, in a pattern corresponding to the pattern of conductor pads on the substrate, whereupon all of the desired solder connections can be made simultaneously.

Figure 1:
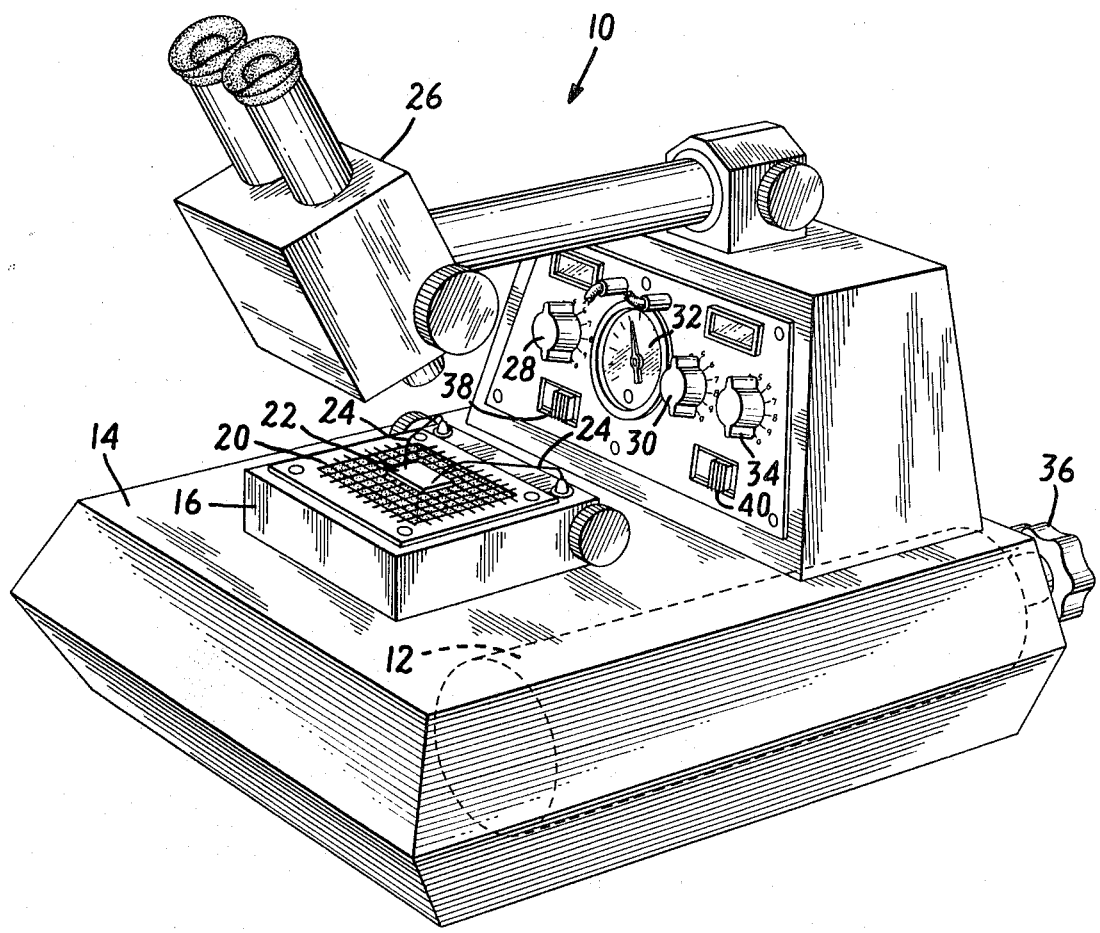
FIG. 1 is a perspective view of apparatus embodying the invention.
Figure 2:
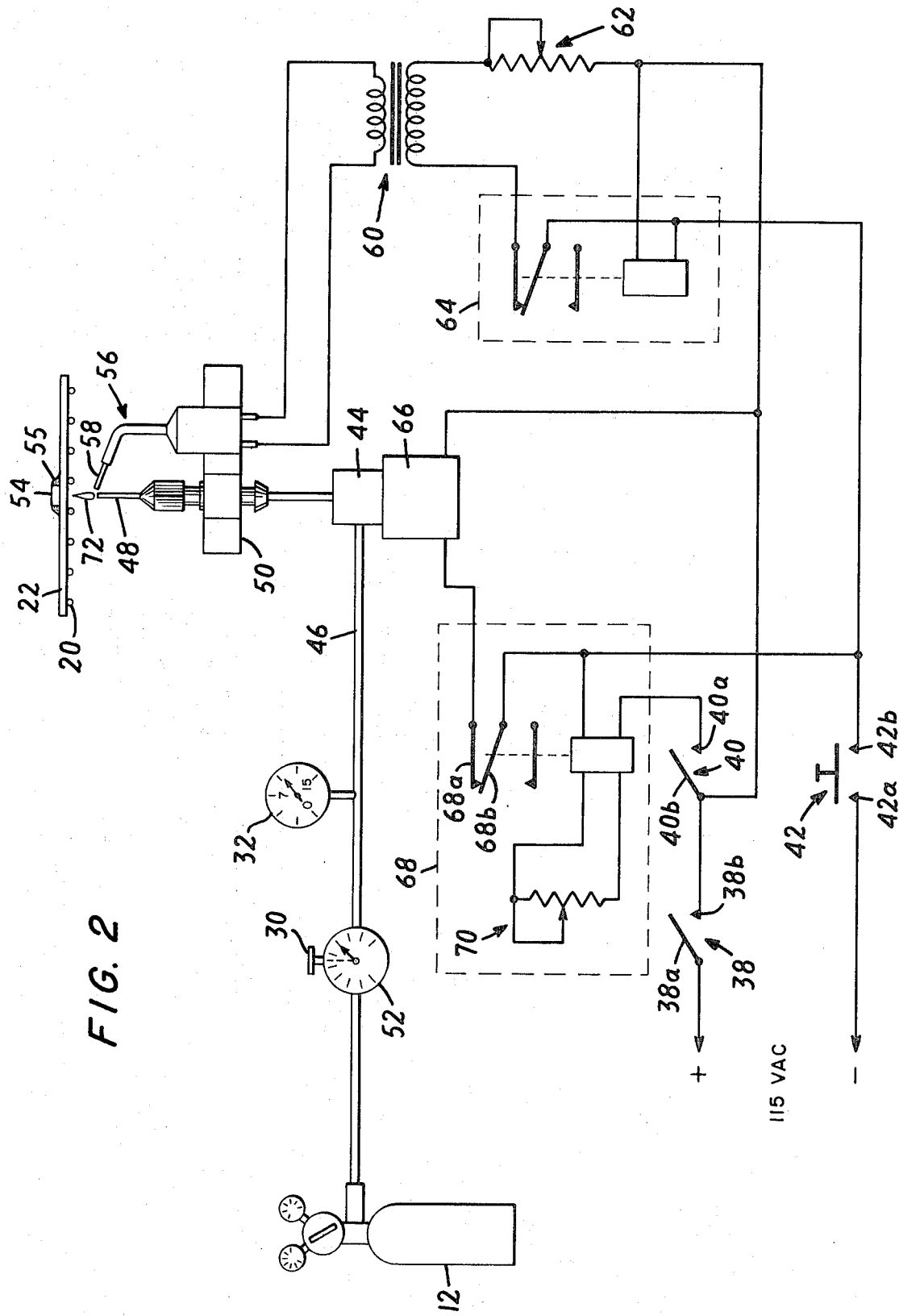
FIG. 2 is a combined block diagram and mechanical schematic view of the apparatus illustrated in the embodiment of FIG. 1.

In a preferred apparatus for practicing the invention, as illustrated in FIG. 1, there is provided a console 10 for enclosing control components and a pressurized supply of hydrogen gas, such as a small tank indicated by the dotted line 12. A forward portion of the console 10 provides a work surface 14 having a rectangular frame 16 resting thereon for sliding movement. The rectangular frame 16 is removable from the work surface, but is placed thereon to surround a miniature torch 18 which is illustrated in FIG. 2. A wire grid 20 is mounted on the upper side of the frame 16, for supporting a substrate 22 to which components are to be soldered. The frame 16 also has a pair of spring elements 24 for springably holding the substrate in its desired position on the wire grid 20 so that the substrate does not shift during sliding movement of the frame. A binocular microscope 26 is mounted on the console and is directed through a point in the plane of the wire grid, which point is directly above the torch element 18. When a component is to be soldered to a particular conductor pad on the substrate 22, the substrate is placed on the wire grid, and the spring elements 24, each of which merely comprises a length of spring wire, are positioned to hold the substrate on the wire grid. The component is then placed on the conductor pad, while the operator can view such manipulations through the binocular microscope. Then, the frame 16 is slidably moved until the desired conductor pad is positioned directly above the torch, whereupon the device is actuated to produce a flame directly beneath the desired conductor pad. The heat from the flame is conducted through the substrate to the conductor pad, to provide the necessary heat for completing the solder connection. The preferred wire grid can be replaced by other substrate support members such as a edge or corner support device, but the wire grid is believed to be the simplest to use.

The console 10 is provided with various controls for apparatus which is described in detail with respect to FIG. 2. Such controls preferably include a dial 28 for adjusting the intensity of a light mounted on the binocular microscope, a dial 30 for adjusting the pressure of the gas discharged from the torch in order to control the heat of the flame, wherein the gas pressure at the torch is indicated on a guage 33, and a dial 34 for controlling the duration of the flame for use in the automatic operation of the device. Illustrated also is an ON-OFF valve 36, at the rear of the console, for controlling the discharge of gas from the tank 12. Also two electrical switches, 38 and 40, are provided on the console for turning ON and OFF the supply power to the device, and for switching between a manual and an automatic cycle as described below.

As illustrated schematically in FIG. 2, the power switch 38 has one terminal 38a for connection to one side of a 115 volt power source, and a second terminal 38b which supplies power to the control circuitry. The other side of the power source is connected to a terminal 42a of a foot-switch 42 which has another terminal 42b connected to the control circuitry, so that when both swtiches 38 and 42 are closed, the 115 volt power source is applied across the control circuitry from contact 38b to contact 42b. The control circuitry is used to open and close a valve 44 connected in a gas line 46 extending between the torch 18 and the supply of gas 12. The torch 18 may comprise a medical syringe needle 48 held by a mounting block 50 which is attached to the work platform 14 of the console. Included amoung other devices which may be used to provide an adequate torch, are shaped sapphire orifices generally used as wristwatch bearings. Preferably, a two stage regulator is provided on the gas tank 12 which, for hydrogen, has an input rating of 1,800 psi and an output of 30 psi coupled through the gas line 46, and through a manually operated valve 52, which is controlled by the dial 30, past the pressure gauge 32, and through the valve 44 to the torch 18.

The torch 18, is illustrated as being disposed directly beneath a microminiature chip-type electronic component 54 which rests on a set of conductor pads on the ceramic substrate 22. As described above, the substrate is supported on the wire grid 20, and the torch is ignited by an igniter element 56 which is disposed directly adjacent the output tip of the torch 18. The ignitor element illustrated in FIG. 2 of the drawing is a platinum wire have a 0.020 in. diameter and being connected at its ends to the secondary of a conventional filament transformer which provides a 6.6 vac supply at 6 amps. The primary of the filament transformer 60 is connected at one side through a 500 ohm rheostat 62 to the contact 38b of the power switch, and at its other side to one contact 64a of a pair of normally closed contacts of a time delay relay 64. The other contact 64b of the normally closed contacts is connected to the terminal 42b of the foot switch to complete a circuit. The energizing circuit for the time delay relay is connected between the terminals 38b and 42b, so that when the supply voltage is applied to the time delay relay, its contacts 64a and b, will open after a fixed delay. Accordingly, when both the power switch and the foot switch are closed, the 115 volt source is applied across the filament transformer until the delay relay opens the contact 64a and b. It has been found that a pulse of 0.1 second duration is preferable for the ignitor element 56, and is sufficient to reliably ignite the torch. The rheostat 62 provides an adjustment for controlling the filament transformer voltage, thus, providing an adjustment for controlling the temperature and extending the life of the igniter wire 58. While this pulsed hot wire filament igniter forms a part of the preferred embodiment, the invention is not limited thereby, and other ignitors can be used such as a hot wire filament which flame, continuously energized, a spark gap, catalytic heating, a pilot frame, and other conventional ignition techniques.

The valve 44 is operated by a solenoid 66 having its coil leads connected respectively to the contact 38b of the power switch and to one contact 68a of a pair of normally closed contacts of a second time delay relay 68. The second contact 68b of the normally closed pair of contacts is connected to the terminal 42b of the foot switch so that when both switches 38 and 42 are closed the supply voltage is applied across the solenoid valve until the contacts of the relay 68 are opened.

In a manual mode of operation, the switch 40 is positioned as shown in FIG. 2, wherein the energization circuit of the relay 68 remains open. Such energization circuit is connected between the terminal 42b of the foot switch and one contact 40a of the switch 40, the other contact 40b of which is connected to the terminal 42b of the power switch. In the automatic mode of operation, the two contacts 40a and b are shorted together so that when both switches 38 and 42 are closed, power is applied to the energization circuit of the second time relay delay circuit. Said relay 68, has a potentiometer 70 connected to its energization circuit, for controlling the time period of the delay thereof. Preferably, the relay and potieniometer are chosen to yield a delay which varies from 0.1 to 0.5 seconds, so that the contacts 68a and b will remain closed for the selected duration after power is applied to the relay 68 through the switches 38, 40 and 42.

In summary, the control circuitry functions as follows: After using the binocular microscope to align the tip of the torch 48 with the component to be soldered, and after switching the power switch 38 to its ON position, a selection is made to operate the device in a manual or automatic mode. Assuming manual operation, the switch 40 is disposed as shown in FIG. 2, whereupon closure of the foot switch 42 by the operator causes the supply voltage to be applied directly across the solenoid device 66 of the valve 44 to permit a jet of gas to be emitted from the torch 48; and, said voltage is also applied across the filament transformer 60 to instaneously heat the ignitor element 56. Thus, depression of the foot switch 42 causes a flame, indicated at 72, to be directed to the underside of the substrate 22. After the delay period of the relay 64, the contacts 64a and b are opened to deenergize the ignitor element. Accordingly, the ignitor element is actuated for a period sufficient to ignite flame 72 whereupon the ignitor element is deactuated. As shown, the time delay relay 64 will be maintained in its energized state until the release of the foot switch, since power will be applied across the relay 64 until that time. Upon release of the foot switch, the contacts 64a and b will again close, in preparation for the next ignition cycle of the device. Also, during the manual operation, the gas valve 44 is maintained in position to supply the gas to the torch until the foot switch 42 is opened to deenergize the solenoid 66. Thus, the operator can observe the formation of the soldered joint, and can release the foot switch after a visual determination of the completion of such joint, such as when the solder 55 assumes the fused condition shown in FIG. 2. In the automatic mode of operation, the switch 14 is positioned to short the contacts 40a and b together so that when the foot switch is closed, the switch 40 will complete the energization circuit for the time delay relay 68. The contacts 68a and b, will open after the delay period, thus automatically terminating the supply of gas and extinguishing the flame 72. Therefore, in this mode of operation, the flame duration can be preset whereupon the operator need only possess sufficient skill to align the component and torch, whereupon closure of the foot switch will initiate an automatic heat cycle for completing the soldered joint.

It can be seen, therefore, that the method and apparatus disclosed herein are particularly useful, with any non-combustible substrate material, for overcoming all of the above described deficiencies of the prior art soldering techniques.

What is claimed is:

1. A method for soldering electronic components to a circuit board having conductor pads on an upper side thereof, comprising the steps of applying solder to a plurality of said conducting pads, positioning a corresponding plurality of electronic components respectively on said plurality of pads, and applying heat to a corresponding plurality of localized areas of the underside of the circuit board aligned respectively with said plurality of conductor pads, wherein said heat is applied by arranging a corresponding plurality of miniature gas discharge orifices in alignment with the respective localized areas, discharging gas from the orifices, and igniting the gas to provide a plurality of heating flames for heating said localized areas, whereby the heat is conducted through the circuit board to effect solder joints at said pads.

2. A method for soldering electronic components to a circuit board having conductor pads on an upper side thereof, comprising the steps of applying solder to a plurality of said conductor pads, positioning a corresponding plurality of electronic components respectively on said plurality of pads, conveying the circuit board along a predetermined path, arranging a plurality of miniature gas discharge orifices below the circuit board and along said predetermined path in a configuration wherein each conductor pad passes in alignment with at least one of the orifices, discharging gas from the orifices continuously while the circuit board is being conveyed, and igniting the gas to provide a plurality of heating flames, whereby localized areas of the underside of said circuit board are heated by said flames and said heat is conducted through the circuit board to effect solder joints at said plurality of pads.

3. In apparatus for soldering an electronic component to a circuit board, wherein the circuit board has a conductor pad on an upper side thereof, the component is placed on the pad, and solder is applied to the junction between the component and pad, an improvement comprising a wire grid and frame means for supporting the circuit board to provide an exposed area at the underside thereof and in alignment with the conductor pad portion, said frame means having the edges of said wire grid attached thereto, torch means having a miniature gas discharge orifice for discharging gas for ignition to produce a flame, wherein said wire grid is suspended above said torch means for supporting said board thereon, wherein said torch means is aligned with said conductor pad, and wherein heat produced by said torch means is conducted through said circuit board to said conductor pad, at a localized area at the underside of said board, for melting said solder.

4. In apparatus for soldering an electronic component to a circuit board, wherein the circuit board has a conductor pad on an upper side thereof, the component is placed on the pad, and solder is applied to the junction between the component and pad, an improvement comprising means for supporting the circuit board to provide an exposed area at the underside thereof and in alignment with the conductor pad portion, torch means having a miniature gas discharge opening disposed beneath the circuit board in a spaced relation therewith for discharging gas for ignition to produce a flame directed toward a localized area of said circuit board aligned with said pad, and control means connected to said torch means for actuation to cause a discharge of gas from said orifice and to automatically ignite said discharge of gas to produce said flame, whereby heat produced by said torch means is conducted through said circuit board from said localized area at the underside of said board to said conductor pad for melting said solder.

5. Apparatus for soldering an electronic component to a circuit board as set forth in claim 4, in which said control means includes a valve connected to said torch means to control the flow of gas to said discharge orifice, a solenoid connected to said valve for actuating said valve in response to an electrical potential applied thereto, switch means for connection to a potential source, and means interconnecting said switch means and solenoid for operating said solenoid to open said valve after closure of said switch means.

6. Apparatus for soldering an electronic component to a circuit board as set forth in claim 5, in which said control means further includes an electrical heating filament disposed adjacent said discharge orifice, and means interconnecting said filament with said switch means for supplying a heating current to said filament upon closure of said switch means, whereby said filament is heated to ignite the gas at said discharge orifice.

7. Apparatus for soldering an electronic component to a circuit board as set forth in claim 6, in which said means interconnecting said filament and switch means includes first delay relay means having an energizing circuit connected to said switch means and having switching contacts connected for supplying current to said filament for a first predetermined period upon closure of said switch means, wherein said switching contacts open upon energization of said delay relay means to terminate the supply of current to said filament.

8. Apparatus for soldering an electronic component to a circuit board as set forth in claim 7, in which said means interconnecting said switch means and solenoid includes second delay relay means connected for energizing said solenoid for a second predetermined period upon closure of said switch means, whereupon said solenoid is deenergized, thereby opening said gas valve for said second predetermined period upon closure of said switch means.

9. Apparatus for soldering an electronic component to a circuit board as set forth in claim 4, further comprising a console having said torch means, said circuit board support means, and said control means connected thereto, and in which said torch means includes a tank of hydrogen gas connected to said discharge orifice and disposed within said console.

10. Apparatus for soldering an electronic component to a circuit board as set forth in claim 4, further comprising a binocular microscope and means mounting said microscope in position for use in aligning said torch means with said localized area of the underside of said circuit board.

11. Apparatus for soldering an electronic component to a circuit board as set forth in claim 4, comprising a console having said torch means, said circuit board support means, and said control means connected thereto, said console having an upper work surface and having said torch means mounted to said work surface, and in which said means for supporting said circuit board includes a rectangular frame slidably disposed on said work surface and having means for holding said circuit board for positioning said circuit board with respect to said torch means.

12. Apparatus for soldering an electronic component to a circuit board as set forth in claim 11, in which said means for holding said circuit board includes a wire grid connected at its edges to said frame for receiving said circuit board thereon.

13. Apparatus for soldering an electronic component to a circuit board as set forth in claim 12, further comprising spring means for releasably holding said circuit board in place on said wire grid.

* * * * *

UNITED STATES PATENT OFFICE
CERTIFICATE OF CORRECTION

Patent No. 3,797,100                    Dated March 19, 1974

Inventor(s) Lawrence T. Browne

It is certified that error appears in the above-identified patent and that said Letters Patent are hereby corrected as shown below:

| | |
|---|---|
| Column 2, line 15, | "underside" should read --upperside-- |
| Column 2, lines 19/20, | "preferably" should read --preferable--; |
| Column 3, line 33, | "termainsl" should read --terminals-- |
| Column 5, line 40, | "flame," should be deleted; |
| Column 5, line 40, | before "continuously" insert --is--; |
| Column 5, line 41, | "frame" should read --flame--; |
| Column 6, line 57, | "conducting" should read --conductor-- |

Signed and sealed this 24th day of September 1974.

(SEAL)
Attest:

McCOY M. GIBSON JR.              C. MARSHALL DANN
Attesting Officer                Commissioner of Patents